July 14, 1942.   M. W. SEYMOUR   2,289,738
COLOR CORRECTION
Filed Sept. 13, 1940
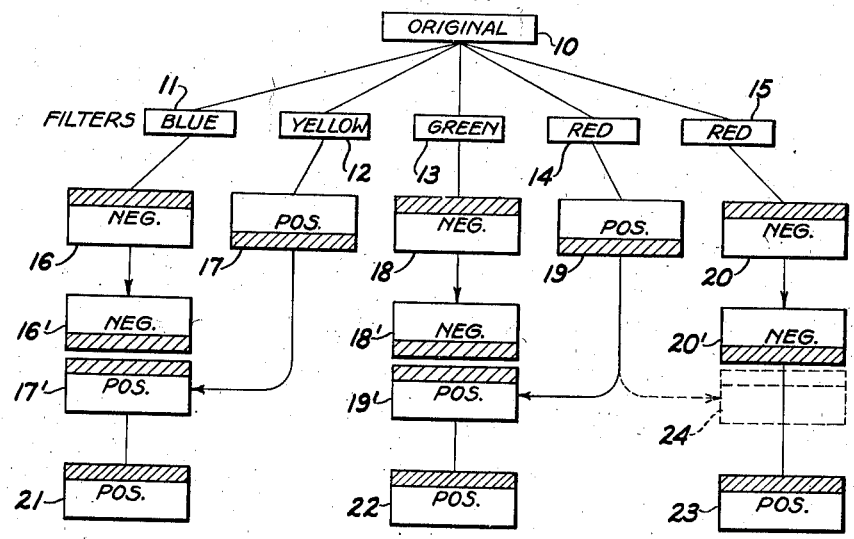
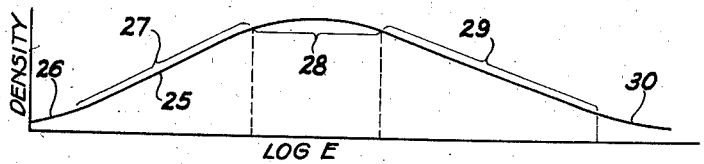
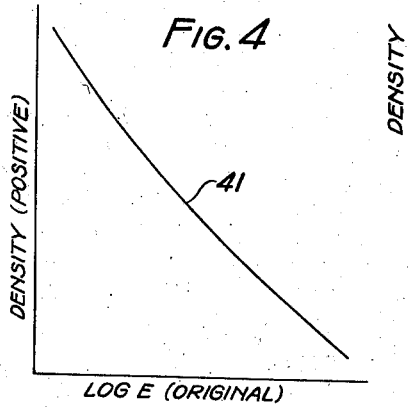
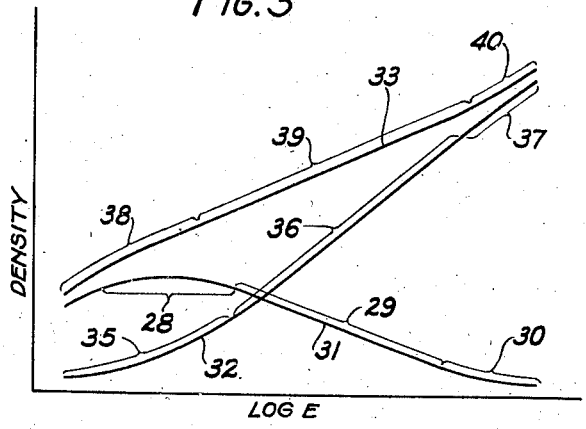
MERRILL W. SEYMOUR
INVENTOR
BY
ATTORNEY Patented July 14, 1942

2,289,738

UNITED STATES PATENT OFFICE 2,289,738

COLOR CORRECTION

Merrill W. Seymour, Rochester, N. Y., assignor to Eastman Kodak Company, Rochester, N. Y., a corporation of New Jersey Application September 13, 1940, Serial No. 356,669

9 Claims. (Cl. 95—2)

This invention relates to color correction in color photography and particularly in photo-mechanical processes.

It is an object of the invention to provide a process of color reproduction in which colors are accurately reproduced. That is, it is an object of the invention to produce color corrected color separation positives such as printing plates, wash-off relief matrices or ordinary photographic positives from which color printers can be made.

Specifically it is an object of the invention to produce masks to be used with negatives to give color correction and/or tone correction.

In ordinary processes of color correction of the masking type, three color separation negatives are made through the primary color filters from the original to be reproduced. From one or more of these color separation negatives, color separation positives are then made to be used as masks for at least one of the other negatives. It is an object of the present invention to provide a method of making masks which requires less overall time than the above-described process.

Furthermore the invention gives this added speed without interfering with the choice of colors represented by the mask. In fact the masks are made in a process physically (not optically) independent of the negatives and hence the choice of colors available is even wider than in the ordinary processes.

In general masks are used only for the color correction. It is a specific object of the present invention to provide masks and a process of making such masks which can be used for correction of the quality of tone reproduction, i. e. to improve the highlights or shadows or both. In general the masks can be used simultaneously for both tone and color correction.

According to the invention, instead of making color separation negatives and then making positives from some of these negatives, the masks are made at substantially the same time as the negatives by recording color separation images of the original on auto-positive material (e. g. that described by Leermakers in U. S. 2,184,013). This eliminates entirely an objection to the masking process of color correction which objection is of considerable practical importance, namely the extra time consumed in the making of masks after the color separation negatives are finished. That is, according to the invention the negatives and masks are exposed and processed at substantially the same time, i. e. substantially simultaneously.

It is well known that the main need for masking arises from the imperfections in color of the magenta, yellow and blue-green dyes, pigments, or inks used in reproduction. In general yellow coloring materials are satisfactory, magenta materials include the equivalent of some yellow, i. e. they absorb blue but may still be satisfactory and blue green materials include the equivalent of both of the others. If the magenta is sufficiently satisfactory so that only the blue-green need be corrected for, the green and blue negatives are masked by the positives corresponding to the red negative. If correction for magenta is also required the blue negative must be masked by a positive corresponding to the green negative as well as by one corresponding to the red. The two masks on the blue negative in this case may sometimes be satisfactorily replaced by a single mask made from a negative taken through a yellow filter, but are not exactly equivalent thereto since the addition of exposures is not the same as the addition of densities. Thus the red negative is unmasked, the green negative is combined with a red positive and the blue negative is combined with a red positive, combination of red and green positives, or simply with a yellow positive.

On the other hand, both magenta and blue green may absorb blue to an undesirable degree but the blue-green substance may not absorb green to an intolerable degree. In this case, the blue negative is usually the only one needing to be masked and a green or yellow positive may be sufficient. In place of using a red filter positive to mask the green filter negative, and a yellow filter positive to mask the blue filter negative, it is some times desirable to use a red filter positive to mask the green filter negative and a green filter positive to mask the blue filter negative.

Further according to the invention, the amount of exposure of the auto-positive material is controlled so as to employ at least one of the ends of the characteristic response curves of that material. This permits correction of the tonal qualities in the highlights and/or shadows of the colored original being reproduced. The masks thus made can be used simultaneously for tone and color correction or for either separately. Since auto-positive emulsions operate on the solarization portion of the characteristic curve the first end of the curve is the shoulder or top and the other end is in the first solarization valley of this curve. The tone reproduction of the whole process is improved by using this shoulder and/or valley portion of the curve when making the auto-positive masks. To use the shoulder the exposure must be slightly less than that necessary to record the shadows on the main solarization portion of the characteristic curve and to use the valley the exposure must be slightly greater than that necessary to record the highlights on the solarization portion. Both of these conditions can be realized at the same time provided that the latitude of the solarized portion of the curve is not too great.

In a preferred embodiment of the invention a mask is made through a red filter with the exposure required to give the proper tone correction and this mask is used over all three negatives. That is, a low gamma red separation positive is used to remove magenta from the greens and yellow from the blues and thus to increase the luminosity of the greens and blues in the reproduction. It also results in an increase in the saturation of the reds, magentas and yellows where the contrast of the print is increased to compensate for the flattening produced by the positive masks. And furthermore, it results in increased contrast in the shadows and/or highlights, whereby improved tone reproduction throughout an extended range is attained. The tone control is direct and complete only when the negative and auto-positive are made through the same filter, but a useful amount of tone control without an undesirable amount of color distortion in the shadows or highlights can be obtained when this system is combined with color correction. For example, a green negative can be color corrected by a red positive and also tone corrected to some degree by the same positive. At least the mask has no tendency to spoil the tone further. Theoretically the green negative should be masked by both a red positive and a green positive. For this reason a yellow filter positive with the green negative also gives improved quality.

Similarly a magenta filter auto-positive or even an auto-positive without any filter (i. e. white light auto-positive) can be used for a mask for the blue negative, the red or green contents of the mask being for color correction and the blue content being for tone correction. Thus this tone control system is applicable to all the usual masking systems with or without exposure of the mask to the same color light as the negative.

Other objects and advantages of the invention and the invention itself will be fully understood from the following description when read in connection with the accompanying drawing, in which:

Fig. 1 is a flow chart illustrating the making of color corrected positives according to the invention.

Fig. 2 shows the characteristic curves of an emulsion including the regular negative portion and the solarization or auto-positive portion.

Fig. 3 is a graph illustrating how masks according to the invention provide tone correction.

Fig. 4 is the tone reproduction curve of the final positive compared with the original.

In Fig. 1 an original color picture or scene 10 is photographed through three primary color filters 11, 13, and 15 on regular negative films 16, 18, and 20. The original 10 is also photographed through a yellow filter 12 on an auto-positive material 17 and separately through a red filter 14 on an auto-positive film 19.

The exposures on the auto-positive films are preferably made through the base so that when these films are later used for masks for the negatives, they can be placed in close register therewith as illustrated. The yellow separation positive 17 is used in the position 17' to mask the blue filter negative shown in position 16'. A corrected positive 21 is made by printing from this negative 16', as masked by the positive 17'. Similarly a corrected positive 22 is made from the negative 18' masked by the positive 19' corresponding to the negative and positive 18 and 19.

As will be described in detail below, these masks may correct not only for color in the same way as ordinary masks, but also for deficiencies in tone rendering. In fact, the positive 19 may be used in the position 24 to correct the tone i. e. to give good rendition in the highlights and shadows of the negative 20 shown in position 20'. From this latter mask combination, a tone corrected positive 23 is produced. The positives 21, 22 and 23, may be photographic films, wash-off relief matrices, or printing plates for mechanical printing.

In a preferred embodiment the red positive 19 is used to mask all three negatives 16, 18 and 20, the yellow positive 17 being dispersed with. That is, the positive 19 is placed at 17' in masking register with negatives 16' instead of using the positive 17 at that point. This gives improved tone rendition particularly to the blue-green and gives correction for the imperfections in the color of the blue-green coloring material.

In Fig. 2 there is illustrated a characteristic curve 25 of a photographic emulsion showing the toe 26, the usual negative portion 27, the shoulder 28, the solarization portion 29, and the first solarization valley 30 of this curve. In this density versus log E curve the portion 27 is the part usually used and gives a negative from a positive or vice versa. On the other hand auto-positive materials utilize the solarization portions 29 wherein increased exposure decreases the density and thus a positive can be made directly from a positive without reversal processing.

The present invention is concerned not only with this solarization portion 29, but also the ends of this auto-positive curve which ends include the shoulder 28 and the valley 30.

In Fig. 3 the curve 32 is that of the response of one of the separation negatives 16, 18, or 20. Negative 20 will be considered in this example. The curve 32 includes a toe 35 of reduced slope, a straight line portion 36 with normal slope equivalent to the gamma and an upper end 37 which may be on the straight line portion or on the shoulder and hence of reduced slope. Similarly 31 is the portion of the characteristic curve 25 of the auto-positive 19 which is used for making the mask 24. The resulting density of the negative 20' masked by the positive 24, will follow a response curve 33 which is the addition of curves 31 and 32. In this example the highlights of the original 10 are recorded on the region 37 of curve 32 and on the region 30 of curve 31; the shadows are recorded in regions 35 and 28 respectively. It will be seen that in the curve 33, the gradation is steeper in the shadow portion 38 of the curve than it is in the middle portion 39. In general the reproduction of shadow portions of any original have too low contrast because they come on the region 35 of the negative and sometimes also because they come on the shoulder of the response curve of the final positive medium (e. g. 23). Thus when the processing is controlled so that the gamma of the region 39 is correct, the effect of the toe 35 is eliminated giving the region 38 whose slope is equal to that of region 39 or even greater to compensate for the shoulder of positive material 23.

It is also advisable to use the valley portion 30 of the curve 31 for the highlights of the positive and thus to accentuate the gradation in the highlights of the print. That is, since the valley portion 30 of the curve 31 is relatively flat, it does not, when added to the region 37 of the curve 32, reduce the contrast of the latter curve but gives a portion 40 which is steeper than the middle tones in region 39. If the region 37 is on the shoulder of the curve 32 and hence has too low a gradient compared with region 36, the flatness of region 30 will compensate for this discrepancy whereby the region 40 will have a gradient at least equal to region 39. On the other hand when, as is usually the case, the region 37 is steep enough (i. e. equal to 36) the increased gradation of region 40 compared to region 39, will compensate for the low gradient of the toe of the ultimate positive 23, on which toe the highlights must necessarily be recorded.

The use of both or either of the end portions 28 and 30 of the curve 31 thus tends to straighten out the reproduction curve whereby, as shown in curve 41 in Fig. 4, the reproduction densities are almost linearly proportional to the log of the exposures which correspond to the reflectivities of the original 10.

Whether this process is used for color correction or tone correction or both, it must be emphasized that one of its greatest practical advantages is the fact that the positives 17 and 19 can be made and processed at the same time as the negatives 16, 18 and 20 are being made. Also since the filters 12 and 14 may be of any desired color to give the necessary correction, the masks 17 and 19 are in no way dependent on the operations used in making the negatives 16, 18 and 20. Of course the filter colors are selected in accordance with the usual inter-relation of color characteristics which inter-relation depends upon the dyes or inks used in making the final reproduction. The usual inter-relations in every stage of a color reproduction process and particularly in those processes employing masking methods of color correction are well known and need not be explained in detail here, except to point out that they need not be affected in any way by introduction of the present invention. That is, the invention is equally applicable to all masking processes, providing those processes involve the type of errors which can be corrected by ordinary masking or which require tone correction as described above.

Having thus described my invention in detail, I wish to point out that it is not limited to the specific example shown, but is of the scope of the appended claims.

What I claim and desire to secure by Letters Patent of the United States is:

1. In a process for the reproduction of a multicolored original, the method of making corrected color separation positives which comprises successively positioning more than three photo-sensitive layers on separate supports in printing relation to the original, three of the layers being of normal negative materials and at least one of the layers being of auto-positive material, exposing said three of the layers respectively to the primary colors from the original, exposing said auto-positive layer to light from the original, the color of the light corresponding to that required for color correction by masking of at least one of the primary color layers, processing substantially simultaneously the three primary color layers to negatives and the auto-positive layer to a positive, masking the negative consisting of said one of the primary color layers by the latter positive and making positives from the three negatives as masked.

2. In a process for the reproduction of a multicolored original, the method of making corrected color separation positives which comprises making the three primary color separation negatives of the original, placing an auto-positive sensitive layer in printing relation to the original, exposing said layer by colored light from the original, the color of the light corresponding to that required for a mask for at least one of said negatives, the amount of exposure being sufficient to include at least one of the ends of the characteristic response curve of said auto-positive layer, developing the layer, placing it in masking register with said one of the negatives and making positives from the negatives as masked.

3. In a process for the reproduction of a multicolored original, the method of making corrected color separation positives which comprises making the three primary color separation negatives of the original placing an auto-positive photosensitive layer in printing relation to the original, exposing said layer by colored light from the original, the color of the light corresponding to that required for a mask for at least one of said negatives, the exposure being slightly less than that necessary to record the shadows of the original on the solarization portion of the characteristic response curve of said auto-positive layer, developing the layer, placing it in masking register with said one of the negatives and making positives from the negatives as masked.

4. In a process for the reproduction of a multicolored original, the method of making corrected color separation positives which comprises making the three primary color separation negatives of the original, placing an auto-positive photo-sensitive layer in printing relation to the original, exposing said layer by colored light from the original, the color of the light corresponding to that required for a mask for at least one of said negatives, and the exposure being sufficient to record the highlights of the original on the first solarization valley of the characteristic response curve of said auto-positive layer, developing the layer, placing it in masking register with said one of the negatives and making positives from the negatives as masked.

5. In a process for the reproduction of a multicolored original, the method of making corrected color separation positives which comprises making the three primary color separation negatives of the original, placing an auto-positive photo-sensitive layer in printing relation to the original, exposing said layer by colored light from the original, the color of the light corresponding to that required for a mask for at least one of said negatives, developing the layer, the exposure and development being sufficient to record the shadows of the original on the shoulder of the characteristic response curve of said layer and to record the highlights of the original on the first solarization valley of the characteristic response curve of said auto-positive layer, placing the developed layer in register with said one of the negatives and making positives from the negatives as masked.

6. In a process for the reproduction of a multicolored original, the method of making corrected color separation positives which comprises making the three primary color separation negatives of the original, placing an auto-positive photo-sensitive layer in printing relation to the original, exposing said layer to primary red light from the original, the exposure being such as to include at least one of the ends of the characteristic response curve of that autopositive layer, developing the layer, placing it in turn in masking register with each of the negatives and making positives from the negatives as masked.

7. In a process employing magenta, yellow and blue-green coloring materials for the reproduction of a multicolored original where the yellow is substantially satisfactory, the magenta includes the equivalent of some yellow, and the blue-green includes the equivalent of a portion of both of the others, the method of making corrected color separation positives which comprises positioning three normal negative photo-sensitive layers successively in printing relation to the original, exposing them respectively to the three primary colors, positioning at least two auto-positive photo-sensitive materials successively in printing relation to the original, exposing one of the auto-positive layers to primary red light from the original, exposing the other of the two auto-positive layers to yellow light from the original, processing substantially simultaneously the three primary color layers to negatives and the auto-positive layers to positives, masking the blue negative by the yellow positive and making a positive from the combination, masking the green negative by the red positive and making a positive from this second masking combination and making a positive from the red negative.

8. The method according to claim 7 in which the exposing of each of the auto-positives is sufficient to include at least one of the ends of the characteristic response curve of that auto-positive material.

9. The method according to claim 7 in which the exposing of the red auto-positive is sufficient to include at least one of the ends of the characteristic response curve of that auto-positive material and the red negative is masked by this red autopositive while making a positive from the red negative.

MERRILL W. SEYMOUR.